United States Patent [19]
van der Lely

[11] 3,902,560
[45] Sept. 2, 1975

[54] SOIL CULTIVATING IMPLEMENTS OR ROTARY HARROWS

[76] Inventor: Cornelis van der Lely, 7 Bruschenrain, Zug, Switzerland

[22] Filed: Dec. 3, 1973

[21] Appl. No.: 421,280

[30] Foreign Application Priority Data
Dec. 4, 1972 Netherlands.................... 7216408

[52] U.S. Cl. ................ 172/59; 172/111; 172/713; 172/763
[51] Int. Cl.² .................... A01B 33/00; A01B 39/22
[58] Field of Search ................ 172/47–49, 172/52, 59, 110–112, 169, 522–526, 713, 719, 747, 763; 37/142 R, 142 A; 175/410

[56] References Cited
UNITED STATES PATENTS

| | | | |
|---|---|---|---|
| 265,084 | 9/1882 | Howard | 172/713 |
| 372,008 | 10/1887 | Ballard | 172/111 X |
| 2,206,283 | 7/1940 | Jacobs et al. | 172/111 X |
| 2,545,173 | 3/1951 | Shaw | 172/49 |
| 2,582,364 | 1/1952 | Tice | 172/49 |
| 3,616,862 | 11/1971 | van der Lely | 172/47 |
| 3,774,687 | 11/1973 | van der Lely | 172/59 X |
| 3,774,689 | 11/1973 | van der Lely et al. | 172/522 X |
| 3,809,166 | 5/1974 | van der Lely et al. | 172/59 X |

FOREIGN PATENTS OR APPLICATIONS
7,734  5/1884  United Kingdom................ 172/169

*Primary Examiner*—Stephen C. Pellegrino
*Attorney, Agent, or Firm*—Mason, Mason & Albright

[57] ABSTRACT

A soil cultivator has rotary soil working members with downwardly extending tines that have upper fastening portions releasably connected to supports. The supports are fastened to rotatable upwardly extending shafts. The fastening portion of each tine can be at a right angle or coextend with its soil working portion, but in either case, the fastening portion is substantially entirely received within a holder of a horizontal support. The support can have a holder at each end thereof which has a cavity to receive a tine's fastening portion. Retaining or fastening means such as cotters, lugs or bolts holds the tine in place with respect to its holder and a shield can also be secured to protect the holder-tine connection from stones and other debris. The tine fastening portion has a cross section so that when in place within its holder, the dimension of the cross section, in a radial direction with respect to the shaft, is at least equal to the dimension of the fastening portion in a direction tangential to a circle centered on the same shaft.

18 Claims, 10 Drawing Figures

SOIL CULTIVATING IMPLEMENTS OR ROTARY HARROWS

According to the invention, there is provided a soil cultivating implement or rotary harrow of the kind set forth, wherein the tine fastening portion is received substantially wholly within a holder of said support and has a cross-section which is such that the magnitude of its dimension in a radial direction with respect to the corresponding axis of rotation is not less than the magnitude of its dimension in a direction tangential to a circle centered upon the same axis, at least one fastening member being provided to retain the connection between the tine fastening portion and the holder.

For a better understanding of the invention and to show how the same may be carried into effect, reference will now be made, by way of example, to the accompanying drawings, in which.

Figure 1:
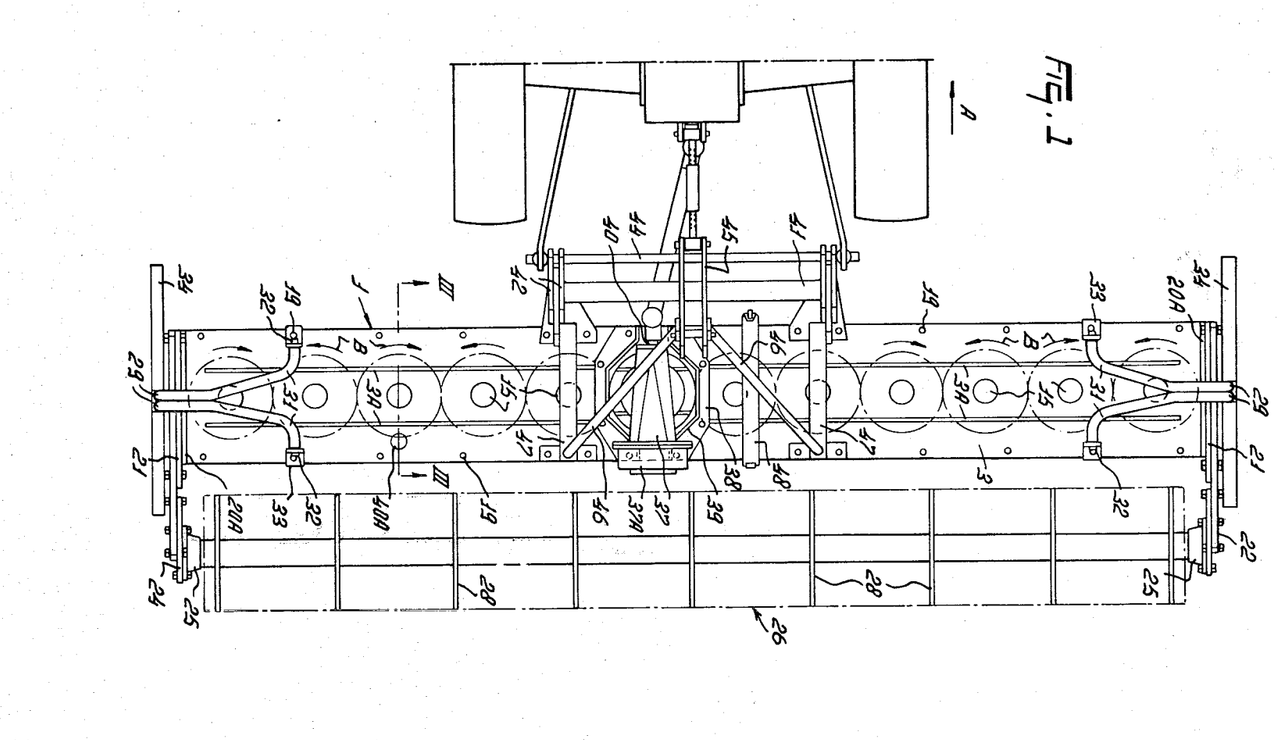
FIG. 1 is a plan view of a soil cultivating implement or rotary harrow in accordance with the invention connected to the rear of an agricultural tractor.
Figure 2:
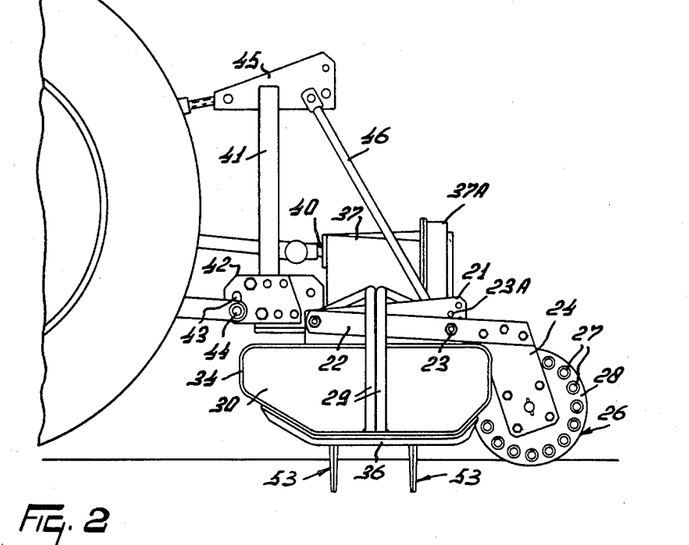
FIG. 2 is a side elevation corresponding to FIG. 1.
Figure 3:
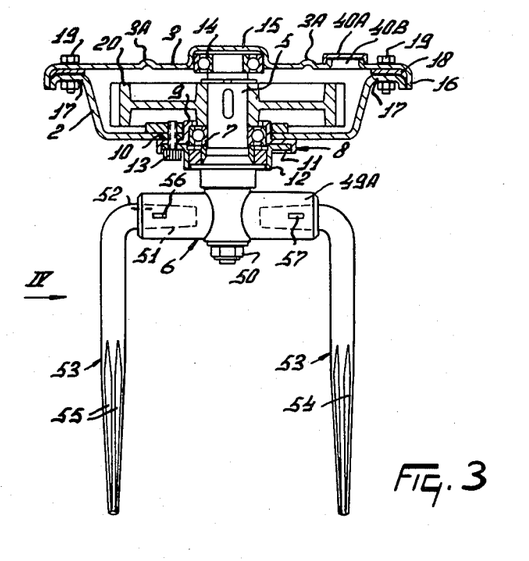
FIG. 3 is a section, to an enlarged scale, taken on the line III—III of FIG. 1.

Referring to FIGS. 1 to 4 of the drawings, the soil cultivating implement or rotary harrow that is illustrated has a frame portion 1 that extends substantially horizontally transverse, and normally substantially perpendicular to the intended direction of operative travel of the harrow which is indicated by an arrow A in FIGS. 1 and 2 of the drawings. The frame portion 1 is afforded principally by a beam 2 (FIG. 3) of shallow U-shaped or channel-shaped cross-section whose limbs diverge upwardly away from its base. The upper edges of said limbs are bent over to form substantially horizontal rims 17 and at least one cover plate 3 is secured to those rims by a number of small vertically disposed bolts 19. A plurality of soil working members or rotors 6 are rotatably mounted beneath the frame portion 1 in a single row so as to be rotatable about corresponding substantially vertical, but at least upwardly extending, regularly spaced apart axes. In the particular example which is being described, there are twelve of the soil working members or rotors 6 but it is emphasised that alternative numbers thereof may equally well be provided. The axes of rotation of the soil working members or rotors 6 are afforded by corresponding substantially vertical or at least upright rotary shafts 5, said shafts 5 being mounted in lower ball bearings 7 carried in housings 8 that are received in openings or recesses in the bottom of the beam 2. Each housing 8 comprises an upper substantially horizontal portion 9 formed from sheet material that fits in the corresponding opening or recess in the beam 2, a lower substantially horizontal rim-like portion 10 and a substantially vertically bent-over circumferential lip that projects downwardly from the outermost edge of the portion 10. The lip which has just been mentioned closely surrounds a substantially horizontal rim 11 at the upper edge of a housing portion 12 that is also formed from sheet material. The housing portions 9 and 12 are secured in place, and to one another, by small substantially vertically disposed bolts 13 and, since said portions 9 and 12 are formed from sheet material, the housings 8 are of inexpensive construction and can be removed and replaced quickly and easily when access to one or more bearings 7 is required for maintenance or replacement purposes.

The upper ends of the shafts 5 are received in corresponding ball bearings 14, each bearing 14 being arranged in an individual housing 15 whose walls are integral with the cover plate 3 or corresponding cover plate 3. It can be seen from FIG. 3 of the drawings that the or each cover plate 3 is formed with rims 16 that are shaped to fit the previously mentioned rims 17 of the limbs of the beam 2, a gasket or packing 18 being interposed between the rims 16 and 17 and being maintained in positions between those rims by the bolts 19. The or each cover plate 3 is formed with a pair of stiffening ribs 3A, said ribs 3A extending lengthwise of the or each plate 3 (i.e. perpendicular or transverse to the direction A) in parallel spaced apart relationship. The employment of the rims 16 and 17 and the stiffening ribs 3A gives the frame portion 1 sufficient rigidity even when sheet material having a thickness of less than 3 millimeters is employed. Fewer of the bolts 19 are required and a saving in weight is produced without any reduction in strength.

Each of the shafts 5 is provided, inside the hollow beam 2, with a corresponding straight- or spur-toothed pinion 20, said pinions 20 being disposed in such a way that the teeth of each pinion are in mesh with those of its neighbour, or both of its neighbours, in the single row thereof. The perpendicular distance between the longitudinal axes (axes of rotation) of neighbouring shafts 5 should not be greater than 30 centimeters and it is preferred that it should have a magnitude of substantially 25 centimeters. The opposite lateral sides or ends of the hollow beam 2 are closed by substantially vertical plates 20A to which plates further substantially sector-shaped plates 21 are fastened. Arms 22 are mounted alongside the plates 21 so as to project rearwardly beyond the plates 21 with respect to the direction A and so as to be turnable upwardly and downwardly with respect to the plates 21, and thus with respect to the frame portion 1, about substantially horizontally aligned pivots located at the tops and fronts of the plates 21 with respect to the direction A. Rear-most portions of the plates 21 with respect to the direction A have a substantial vertical extent and are formed with a plurality of holes 23A any chosen one of which can be brought into register with a single hole in the corresponding arm 22 by turning that arm to an appropriate angular setting about the axis of its pivotal mounting at the front of the corresponding plate 21. Substantially horizontal bolts 23 are provided for entry through the single holes in the arms 22 and the chosen holes 23A in the plates 21 to retain said arms 22 in corresponding angular settings about the substantially coincident pivotal axes of the mountings that have just been mentioned. The rearmost ends of the arms 22 with respect to the direction A carry supports 24 that project downwardly from those ends and rearwardly with respect to the direction A. A soil compressing member in the form of a ground roller 26 is rotatably mounted between the two supports 24 with the aid of horizontal bearings 25, said roller 26 comprising a central axial shaft carrying a plurality, such as nine, of substantially vertical plate-like supports 28 of substantially circular configuration that are spaced apart from one another at regular intervals. The periphery of the roller 26 is provided with a plurality, such as eighteen, of elongated elements 27 that are entered through holes in the supports 28 in such a way as to be turnable in those holes and readily detachable therefrom. Small transverse "safety" pins or other simple releasable fastenings may be employed for this purpose. The elements 27 may extend parallel to the axis of rotation of the roller 26 or may be wound helically therearound to a greater or lesser extent. In the embodiment which is illustrated, each element 27 is of tubular construction but, as an alternative, said elements 27 may be of solid rod-like formation.

Shield plates 30 that are normally substantially vertically disposed and that normally extend substantially parallel to the direction A are arranged alongside the opposite lateral sides or ends of the row of soil working members or rotors 6 just beyond the plates 20A and 21. Each shield plate 30 is fastened to a corresponding pair of arms 29 and it will be seen from FIGS. 1 and 2 of the drawings that first portions of said arms 29 that are fastened to the plates 30 bear against one another and extend substantially vertically upwards in parallel and abutting relationship with the plates 30 concerned. The arms 29 project upwardly beyond the top edges of the plates 30 for a distance and are then bent over through substantially 90° towards the center of the frame portion 1. At a distance inwardly towards that center from the bend, the two arms 29 of each pair start to diverge and the ends thereof that are remote from the plates 30 are bent over to form end portions 31 with each pair of end portions 31 extending in aligned opposite directions that are substantially horizontally parallel to the direction A. The arms 29 are of tubular formation and the extremities of their end portions 31 are received turnably around stub shafts 32 that are secured to upright limbs of angular lugs 33 which have horizontal limbs that are fastened to the top or tops of the plate or plates 3 by corresponding appropriately positioned bolts 19. Each shield plate 30 is thus turnable upwardly and downwardly about a substantially horizontal axis, extending substantially parallel to the direction A, that coincides with the aligned longitudinal axes of the corresponding pair of stub shafts 32. The hollow end portions 31 of the tubular arms 29 that turnably receive the stub shafts 32 constitute very simple and inexpensive bearings for the pivotally mounted shield plates 30.

Each shield plate 30 is formed around its circumference with a corresponding transverse, and normally perpendicular, rim 34 that projects outwardly from the corresponding plate 30 with respect to the center of the frame portion 1. It can be seen from FIG. 2 of the drawings that each rim 34 includes, along the lowermost edge of the corresponding plate 30, a ground-engaging portion 35 whose rearmost end terminates in an upwardly, and rearwardly with respect to the direction A, inclined portion and whose leading end terminates in an upwardly, and forwardly with respect to the direction A, inclined portion, the last-mentioned portion being inclined to the horizontal at a smaller angle than the portion at the rear end of the ground-engaging portion 35. The bottom of each ground-engaging portion 35 is provided with a corresponding rib or runner 36, said rib or runner 36 being substantially coplanar with the corresponding plate 30 and having leading and rearmost end regions that are bent over to match the portions of the rims 34 that have just been described and that lie at opposite ends of the ground-engaging portion 35 of that rim 34. The provision of the ribs or runners 36 enables the shield plates 30 to slide over the ground surface during the operation of the harrow in relatively stable positions and brings wear upon the lowermost edges of said plates 30 and the ground-engaging portions 35 of their rims 34 to a minimum. The ribs or runners 36 are releasably secured to the rims 34 to enable them to be replaced when this eventually becomes necessary after inevitable wear has occurred. The height of the ribs or runners 36 is such that they do not interfere with the upward and downward pivotal movements of the plates 30 in any way and it will be noted from FIG. 2 of the drawings that the extreme leading and rearmost ends of each rib or runner 36 with respect to the direction A are bevelled.

The soil working members or rotors 6 are rotated, during the use of the implement or harrow, by a drive transmission which includes parts contained within a gear box 37 that is located, when the implement or harrow is viewed from the rear in the direction A, slightly to the left of the center of the frame portion 1 above the sixth soil working member or rotor 6 counting from the left-hand end of the single row thereof under the conditions just mentioned. A substantially horizontal plate 38 is arranged on top of the cover plate or plates 3 and is provided with an upright rim 39 which substantially surrounds the gear box 37. Owing to the provision of the rim 39, the plate 38 may be formed from thinner material than would otherwise be necessary so that there is a saving in weight and the shaping of the plate 38 is facilitated. The shaft 5 that corresponds to the soil working member or rotor 6 above which the gear box 37 is mounted is extended upwardly into that gear box, the extension carrying a bevel pinion whose teeth are in mesh with those of a further bevel pinion carried by a shaft (not visible) that extends substantially horizontally parallel to the direction A. The rearmost end of the shaft which has just been mentioned extends into a change-speed gear 37A by which it can be connected to a further overlying and parallel substantially horizontal shaft 40 by alternative toothed pinions that can give a number, such as four, of different transmission ratios depending upon their relative arrangement. It is not necessary to describe the construction and arrangement of the change-speed gear 37A in further detail for the purposes of the present invention. As can be seen in FIGS. 1 and 2 of the drawings, the leading end of the upper substantially horizontal shaft 40 that extends substantially parallel to the direction A projects from the front of the gear box 37 where it is splined or otherwise keyed to enable it to be placed in driven connection with the power take-off shaft of an agricultural tractor or other operating vehicle by means of an intermediate telescopic transmission of a construction that is known per se having universal joints at its opposite ends. The change-speed gear 37A is adjusted to give a speed of revolution of the soil working members or rotors 6 in response to a more or less constant speed of rotation of the power take-off shaft of the operating tractor or other vehicle that is appropriate to the particular operation that is to be carried out, the nature of the soil that is to be worked and factors such as the moisture content of the soil. The cover plate 3, or one of the cover plates 3, is formed with a lubricant filling opening 40B, said opening being provided with a removable cap or plug 40A formed from a synthetic plastics material. In the operation of the soil cultivating implement or rotary harrow, the hollow interior of the beam 2 is partially filled with oil so that the pinions 20 are substantially constantly immersed in an oil bath.

The front of the frame portion 1 with respect to the direction A has a coupling member or trestle 41 of generally triangular configuration secured to it, said coupling member or trestle being employed in connecting the frame portion 1 to the three-point lifting device or hitch at the rear of an operating agricultural tractor or other vehicle. The coupling member or trestle 41 is provided, at substantially the same level as the frame portion 1, with two pairs of substantially vertical plates 42 which are formed at their fronts with respect to the direction A with substantially vertical slots 43. A substantially horizontal rod 44 that extends perpendicular, or at least transverse, to the direction A is entered through all four of the slots 43 and the opposite ends of said rod that project beyond the furthest remote plates 42 constitute coupling points to which the free ends of the lower lifting links of the three-point lifting device or hitch of an operating agricultural tractor or other vehicle are pivotally connected in the manner shown in outline in FIGS. 1 and 2 of the drawings. The apex of the coupling member or trestle 41 is provided with a pair of substantially vertical plates 45 that both extend substantially parallel to the direction A in closely spaced apart relationship. As shown in the drawings, the free end of the upper adjustable lifting link of the three-point lifting device or hitch of the operating agricultural tractor or other vehicle is pivotally mounted between the two plates 45. Rear regions of the two plates 45 with respect to the direction A are coupled to the upper ends of two tie rods 46 that diverge downwardly, and rearwardly with respect to the direction A, away from said plates 45, the lowermost and rearmost ends of said tie rods 46 being fastened to strengthening beams 47 that extend substantially horizontally parallel to the direction A on top of the cover plate or plates 3. The leading ends of the beams 47 are connected to substantially vertical plates sandwiched between the two pairs of similarly disposed plates 42. A box 48 that may conveniently store tools, spare parts and the like is located at one side of the gear box 37 on top of the plate or plates 3 and between the strengthening beams 47, said box 48 preferably being provided with a pivotable lid that can be retained closed in the simple manner which can be seen in outline in FIG. 1 of the drawings. Each of the plates 42 is formed with a plurality, such as three, of pairs of upper and lower holes 42A so that said plates can be releasably fastened by bolts to the vertical plates than are sandwiched between them in any chosen positions corresponding to the use of single pairs of the holes 42A, said positions being more or less advanced with respect to the direction A as compared with the frame portion 1.

The lowermost end of each shaft 5 that projects from beneath the frame portion 1 is splined or otherwise keyed and has a lowermost screwthreaded extremity. Corresponding tine supports 49A that are disposed substantially perpendicular to the axes of rotation concerned are formed with central matchingly splined or otehwise keyed holes and are fastened to said ends of the shafts 5 by entering those ends through the holes which have just been mentioned and maintaining the connections with the aid of nuts 50 that co-operate with the screwthreads referred to above. Each support 49A is formed at its opposite ends with holders in the form of corresponding inwardly tapering recesses or cavities 51 that are of a polygonal, and preferably square, cross-section. Tines 53 have bent-over fastening portions 52 at their upper ends, said fastening portions 52 being shaped to match the recesses or cavities 51, that is to say, they are of polygonal, and preferably square, cross-section and taper towards their free ends. The end sections of the fastening portions 52 are received throughout their lengths in the recesses or cavities 51 and are retained therein in a manner which will be described below. In this embodiment, the longitudinal axes of the fastening portions 52 substantially coincide with the longitudinal axes of the corresponding supports 49A, said axes being inclined at substantially 90° to the longitudinal axes of active or soil working portions 54 of the tines 53. The upper ends of the active or soil working portions 54 are of substantially right-circular cylindrical configuration but said portions taper very gently in a downward direction towards the free ends or tips of the tine. Each tapering region is of rectangular cross-section and it will be noted that there is a progressive flattening thereof towards the free end or tip which is such that, near the free end or tip, one diagonal (in cross-section) between two opposite corners has a greater magnitude than a second relatively perpendicular diagonal between the other two opposite corners. The arrangement of the whole tine 53 is such that the greater diagonal (in cross-section) that has just been mentioned extends substantially tangentially with respect to a circle centered upon the axis of rotation defined by the corresponding shaft 5. Four concave or at least hollow grooves 55 extend throughout substantially the whole of the length of the active or soil working portion 54 in each of the what would otherwise be flat sides thereof. The uppermost ends of the four grooves 55 taper into the upper cylindrical region of the active or soil working portion 54 and terminate at points in that region. It will be noted from FIG. 4 of the drawings that the active or soil working portions 54 of the tines 53 are inclined rearwardly so as to trail to some extent with respect to the intended direction of rotation B of the soil working member or rotor 6 concerned. The arrow B shown in FIG. 4 should be considered as relating to the tine 53 which is shown as closest to a viewer of that Figure.

The fastening portions 52 of the tines 53 are secured in the holders that are afforded by the recesses or cavities 51 by forming aligned holes 56 through said fastening portions 52 and the walls of the recesses or cavities 51, said holes 56 receiving fastening members in the form of flat but tapering wedges or cotters 57. The broadest ends of the gently tapering wedges or cotters 57 are located foremost with respect to the direction B so that any blow against a stone or other obstacle will tend to tighten the connection of the corresponding tine 53 to its support 49A rather than loosen the same. The flat wedges or cotters 57 are arranged so that their flat sides are substantially horizontally disposed.

Figures 4, 5, 9, 10:
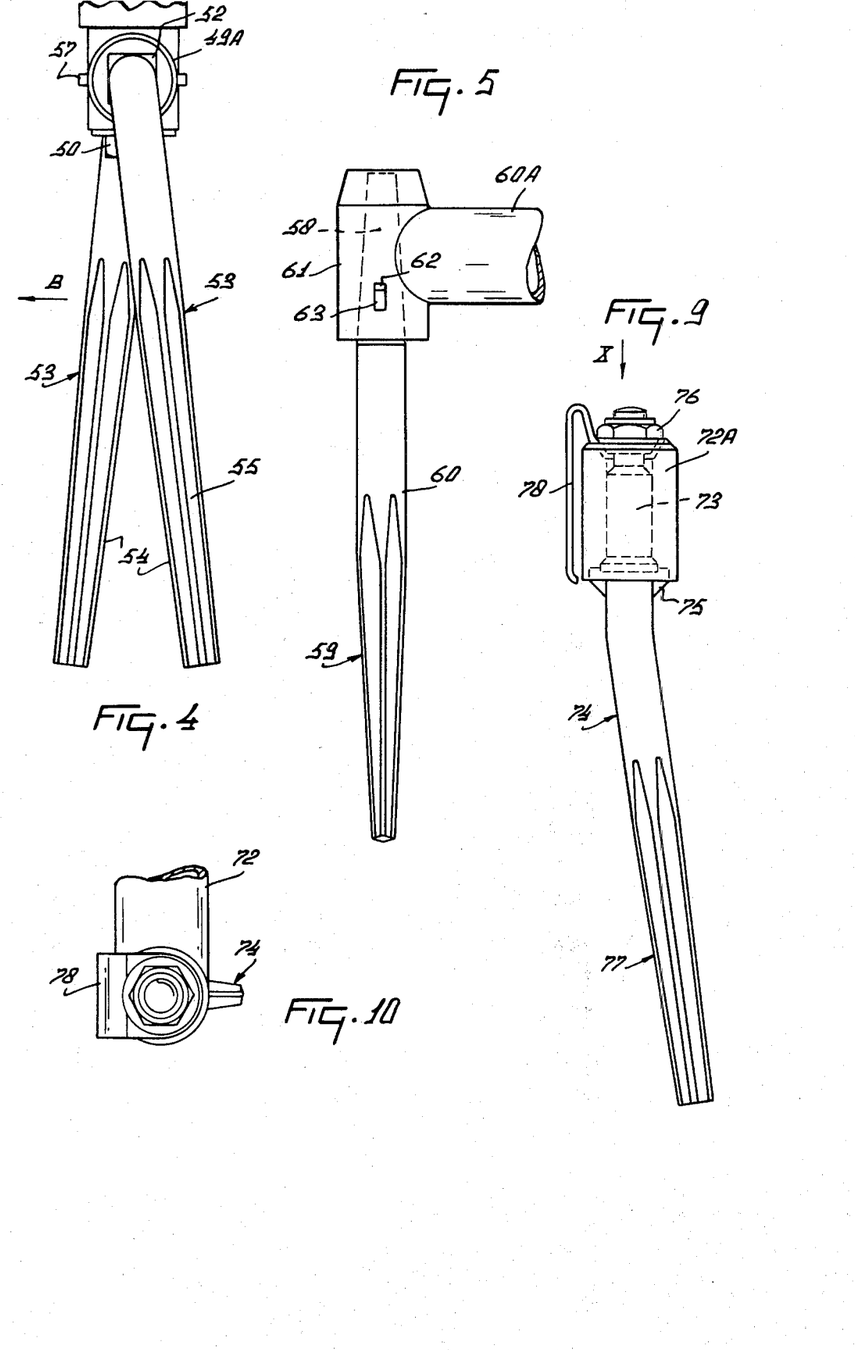
FIG. 4 is a view, to an enlarged scale, as seen in the direction indicated by an arrow IV in FIG. 3.
FIG. 5 is a scrap elevation, to the same scale as FIG. 4, illustrating an alternative construction and arrangement.
FIG. 9 is an elevation to the same scale as FIGS. 4 to 8 illustrating a further alternative construction and arrangement.
FIG. 10 is a view as seen in the direction indicated by an arrow X in FIG. 9.

FIG. 5 of the drawings illustrates an alternative embodiment in which tines 59 have upper tapering fastening portions 58, of square or other polygonal cross-section, said fastening portions 58 having their longitudinal axes coincident, or substantially coincident, with those of lower active or soil working portions 60 that are similar to the previously described active or soil working portions 54. The whole of the length of the illustrated fastening portion 58 is received in the interior of a sleeve-like holder 61 of matching size and shape. It can be seen from FIG. 5 of the drawings that the internal recess or cavity of the sleeve-like holder 61 is actually a blind recess or cavity terminating a very short distance beneath the upper end of the holder 61. This blind construction of the recess or cavity is preferred but it is not absolutely essential and said recess or cavity could be open at both its lower and upper ends. The fastening portion 58 is retained in the holder 61 by forming said portion 58 and holder 61 with aligned transverse holes 62 through which a gently tapering wedge or cotter 63 is driven in such a way that the broadest end thereof is foremost with respect to the intended direction of rotation of the soil working member or rotor 6 concerned. Each such soil working member or rotor 6 includes, in the embodiment of FIG. 5 of the drawings, a substantially horizontally disposed tine support 60A having two of the holders 61 rigidly mounted at its opposite ends in substantially symmetrical relationship with respect to the axis of rotation of the member or rotor 6 concerned. Although the longitudinal axes of the fastening portions 58 and active or soil working portions 60 are substantially coincident, it is, in fact, preferred that said active or soil working portions 60 should be rearwardly inclined by a few degrees so as to trail with respect to the intended direction of rotation of the corresponding soil working member or rotor in substantially the same manner as has been described with reference to FIG. 4 of the drawings.

Figures 6, 7, 8:
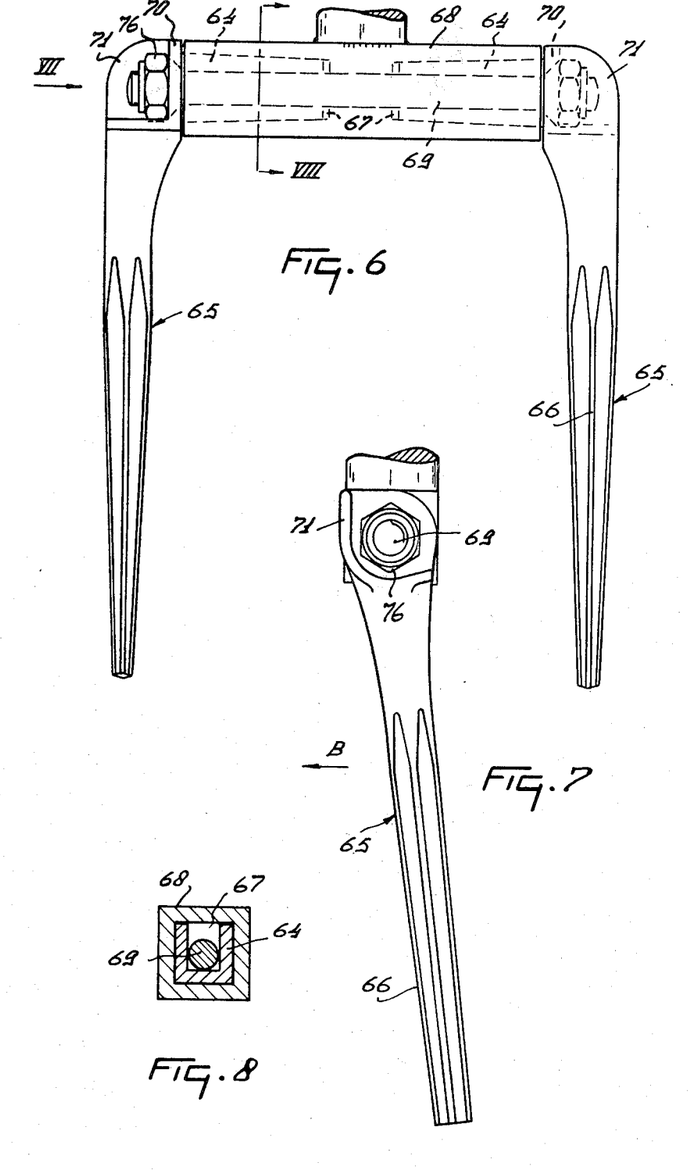
FIG. 6 is an elevation to the same scale as FIGS. 4 and 5 showing a further alternative construction and arrangement.
FIG. 7 is a view as seen in the direction indicated by an arrow VII in FIG. 6.
FIG. 8 is a section taken on the line VIII—VIII of FIG. 6.

FIGS. 6, 7 and 8 of the drawings illustrate an alternative embodiment in which a substantially horizontally disposed tine support 68 is welded or otherwise rigidly secured to the lowermost end of a substantially vertically disposed shaft corresponding to one of the previously described shafts 5. Each soil working member or rotor 6 in this embodiment comprises two tines 65 each of which has a fastening portion 64 and an active or soil working portion 66. The fastening portion 64 of each tine 65 is inclined at an angle of substantially 90° to the corresponding active or soil working portion 66 and, as can be seen in FIG. 8 of the drawings, has a channel-shaped cross-section. The portion 64 is arranged in such a way that its limbs project upwardly from its web. The whole of the fastening portion 64 of each tine 65 is received in a corresponding inwardly tapering recess or cavity 67 that affords a holder which, in this case, is embodied in the support 68. It will be seen from FIG. 8 of the drawings that the whole support 68 is of square cross-section and that each internal recess or cavity 67 thereof is of similar cross-section. The Longitudinal axes of the two recesses or cavities 67 of each support 68 are substantially coincident and also substantially coincide with the longitudinal axis of the support 68 itself. A hole that extends axially of the support 68 interconnects the inner ends of the two recesses or cavities 67 and a stud 69, at least the opposite ends of which are screw-threaded, is entered axially right through the hollow support 68 so as to lie between the upright limbs of the fastening portions 64 of the corresponding pair of tines 65. The fastening portions 64 of the tines are formed, at their junctions with the active or soil working portions 66 thereof, with upright shoulders or collars 70 and these shoulders or collars 70 have substantially central conically mouthed holes through which the stud 69 projects and which co-operate with frustoconical portions of corresponding fastening nuts 76 which nuts are, preferably, shake-proof nuts. Once the two nuts 76 are tightened, the corresponding pair of tines 65 are fixed reliably in their appointed positions using only a single fastening member in the form of the stud 69. Each tine 65 includes a corresponding upwardly directed screening portion in the form of a shield-like lug 71 that is located immediately in front, with respect to the intended direction of rotation B (FIG. 7), of the corresponding nut 76 and the end of the stud 69 with which that nut co-operates.

FIGS. 9 and 10 of the drawings illustrate a further alternative embodiment in which each soil working member or rotor 6 is provided with a substantially horizontally disposed tine support 72 having substantially vertically extending sleeve-like tine holders 72A rigidly mounted at its opposite ends. Each holder 72A co-operates with a fastening portion 73 of a tine 74 that also includes an active or soil working portion 77 of similar construction to the previously described active or soil working portions, each of said portions 77 being inclined rearwardly by a few degrees so as to trail with respect to the intended direction of rotation of the corresponding soil working member or rotor 6. It will be seen from FIG. 9 of the drawings that each fastening portion 73 is provided, adjacent its lowermost end, with two diametrically opposed projections or lugs 75 that are received in matchingly shaped notches or recesses in the lowermost end of the tine holder 72A concerned. The upper end of each fastening portion 73 is screw-threaded and receives a fastening nut 76 that may be similar to one of the nuts 76 that has already been described with reference to FIGS. 6 to 8 of the drawings. Once each nut 76 has been tightened, the projections or lugs 75 co-operate with the recesses or notches in the lower ends of the holders 72A to prevent the tines 74 from turning in their holders 72A about the longitudinal axes of their fastening portions 73. The nut 76 also serves to secure a screening portion in the form of a shield 78 to the corresponding holder 72A. As can be seen in the drawings, each shield 78 extends upwardly from the region thereof that is clamped by the nut 76, the upwardly extending portion merging, by way of a bend of a little less than 180°, into a downwardly directed portion that lies in front of the corresponding holder 72A with respect to the intended direction of rotation of the soil working member or rotor concerned. The lowermost free end of the leading downwardly directed portion of the shield 78 is located at a horizontal level at least as low as the bottom of the holder 72A and the tine fastening portion 73 and it will be seen from FIG. 9 of the drawings that, in fact, it is conveniently located at substantially the same horizontal level as the two projections or lugs 75. The shield 78 serves to screen the tine fastening portion 73, the cooperating holder 72A and the fastening nut 76 from damage and wear by stones and other hard objects which are inevitably encountered by the soil working member or rotor 6 during the use of the soil cultivating implement or rotary harrow of which it forms a part.

In all of the embodiments that have been described, each of the tines has a fastening portion whose cross-section is such that its magnitude in a radial direction with respect to the corresponding axis of rotation is substantially equal to, and certainly not less than, its magnitude in a direction that is tangential to a circle centered upon said axis of rotation. As an alternative, the first-mentioned dimension may exceed the second dimension by substantially one-third.

In the use of a soil cultivating implement or rotary harrow of the kind that has been described when provided with any of the tines and tine mountings as illustrated in FIGS. 3 to 10 inclusive of the drawings, the coupling member or trestle 41 is connected to the three-point lifting device or hitch of an operating agricultural tractor or other vehicle and the projecting leading end of the shaft 40 is placed in driven connection with the power take-off shaft of the same tractor or other vehicle by way of an intermediate telescopic transmission shaft of a construction that is known per se having universal joints at its opposite ends. Upon operative travel over a field, the drive that is imparted to the shaft 40 causes the soil working members or rotors 6 to revolve in the directions B that are shown in FIG. 1 of the drawings. The perpendicular distance between the lowermost free ends or tips of the two tines of each member or rotor 6 is slightly greater than the perpendicular distance between the axes of rotation of immediately neighbouring shafts 5 so that the individual strips of soil that are worked by the various members or rotors 6 overlap to produce, in effect, a single broad strip of worked soil. The working depth of the tines is controlled by engaging the bolts 23 in appropriate holes 23A in the plates 21. This governs the level of the axis of rotation of the roller 26 with respect to the remainder of the implement or harrow and consequently controls the maximum depth to which the tines can penetrate into the soil. The various methods of mounting the tines that have been described permit those tines to be fastened in their operative positions, and to be removed from those positions, both quickly and easily, the tines nevertheless remaining reliably connected to their supports through the intermediary of the holders during operation.

Although various features of the soil cultivating implement or harrow and tines and tine mountings that have been described and/or illustrated in the accompanying drawings will be set forth in the following claims as inventive features, it is emphasised that the invention is not necessarily limited to those features and that it includes within its scope every part of the soil cultivating emplement or rotary harrow and each tine and tine mounting that has been described and/or illustrated both individually and in various combinations.

I claim:

1. A soil-cultivating implement having a plurality of soil-working members supported on frame means, each of said members comprising a generally horizontal support secured to an upwardly extending shaft and at least one tine rotatable about an axis centered on said shaft, said support having an end which is provided with a longitudinal cavity in which an end section of a fastening portion of said tine is inserted and said section being entirely surrounded by said support, said section tapering to a free end and having an angular cross-section which merges in a junction of the remainder of the tine with said fastening portion outside said cavity, said junction having a substantially circular cross-section, retaining means releasably securing said section in said cavity and said retaining means being received both in the end of said support and in the end section of said fastening portion.

2. An implement as claimed in claim 1, wherein said fastening portion has a length which is greater than its cross-section dimensions and said fastening portion extends substantially perpendicular to said shaft.

3. An implement as claimed in claim 1, wherein said section and the end of said support have aligned holes for the reception of said retaining means, said retaining means being a wedge or cotter and having a tapering configuration and being arranged with its broadest end foremost with respect to the normal direction of rotation of said soil-working member.

4. An implement as claimed in claim 1, wherein said fastening portion tapers throughout the whole of its length.

5. An implement as claimed in claim 1, wherein said fastening portion is channel-shaped in cross-section.

6. An implement as claimed in claim 1, wherein said tine has a lower soil working portion and the longitudinal axis of said fastening portion is substantially coincident with the longitudinal axis of said soil working portion.

7. An implement as claimed in claim 1, wherein said fastening portion is inclined to said soil working portion by an angle of about 90°.

8. An implement as claimed in claim 1, wherein said retaining means is a stud positioned in substantially axial alignment with said fastening portion.

9. An implement as claimed in claim 8, wherein said fastening portion is channel shaped in cross section and said stud extends between the limbs of said channel-shaped cross-section.

10. An implement as claimed in claim 8, wherein each soil working member has a tine at each end of said support and the fastening portions of the tines are opposed to one another and secured to said support by a single stud.

11. A soil-cultivating implement having a plurality of soil-working members supported on frame means, each of said members comprising a generally horizontal support secured to an upwardly extending shaft and at least one tine rotatable about an axis centered on said shaft, said support having an end which is provided with a longitudinal cavity in which an end section of a fastening portion of said tine is inserted and said section being entirely surrounded by said support, said section tapering to a free end and having an angular cross-section which merges in the remainder of the fastening portion outside said cavity, said remainder having a substantially circular cross-section, retaining means releasably securing said section in said cavity and said retaining means being received both in the end of said support and in the section of said fastening portion, a lower soil-working portion of said tine extending rearwardly to trail said fastening portion with respect to the normal direction of rotation of the soil-working member.

12. An implement as claimed in claim 11, wherein said soil working portion tapers downwardly to a tip.

13. An implement as claimed in claim 12, wherein said soil working portion has a rectangular cross-section and the diagonals between opposite corners of said soil working portion adjacent said tip, as seen in cross-section, vary.

14. An implement as claimed in claim 13, wherein longitudinally extending grooves are formed between said corners.

15. An implement as claimed in claim 1, wherein said plurality of soil working members are arranged in a row that extends transverse to the intended direction of operative travel of said implement, the distance between adjacent shafts being less than the distance between soil working portions of tines of adjacent soil working members.

16. An implement as claimed in claim 15, wherein the shafts of the soil-working members are received in a hollow frame portion of said frame means and said frame portion extends transverse to the normal direction of travel of said implement, said shafts having intermeshing toothed pinions inside said frame portion and the top of the frame portion being closed by at least one plate with a bent-over rim which cooperates with a further bent-over rim formed at an upper edge of upright walls of the remainder of said frame portion, said plate having integral housings for bearings and said shafts being journalled in said bearings.

17. An implement as claimed in claim 16, wherein upwardly and downwardly pivotable shield plates are positioned adjacent the opposite lateral ends of said frame portion, said shield plates being normally substantially vertically disposed and being pivotably connected to the top of the frame portion by tubular arms, said arms being turnably secured to said top on stub shafts which are positioned in substantially axially aligned pairs and extend substantially parallel to the normal direction of travel.

18. An implement as claimed in claim 17, wherein a lower region of each shield plate has a transverse rim with a ground engaging downwardly extending runner which extends lengthwise throughout substantially the entire bottom of the shield plate.

* * * * *